Patented July 13, 1937

2,086,805

UNITED STATES PATENT OFFICE 2,086,805

PURIFICATION OF THE ISATINS

Robert C. Hoare, Buffalo, N. Y., assignor to National Aniline and Chemical Company, Inc., New York, N. Y., a corporation of New York No Drawing. Application December 5, 1933, Serial No. 701,055

7 Claims. (Cl. 260—47)

This application relates to the purification of isatin and its substitution derivatives and is especially directed to the purification of isatin and its said derivatives whereby there is produced a product of superior quality to that at present commercially obtainable.

Isatin, which presumably has the formula

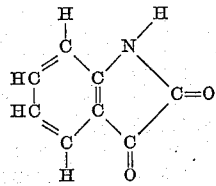

may be prepared by a number of methods. The following methods of preparation are given by way of example. The isatin may be prepared by the oxidation of indigo with nitric acid or by the oxidation of oxindol and dioxindole. It also may be prepared by the action of alkali upon ortho-nitrophenyl-propiolic acid, by heating isatin alpha-anil:

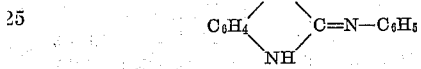

with a dilute mineral acid, or by heating oxanilide chloride:

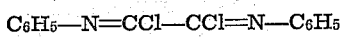

with concentrated sulfuric acid.

The melting point of isatin is given as 201° C. by Richter in his "Organic Chemistry" (D'Albe translation) 1922, Vol. II, page 389.

I have now found that by the conversion of isatin to an isatin bisulfite, and treatment of the bisulfite with a decolorizing material, the purity of the isatin bisulfite is substantially improved. I have also found that impurities are still further removed upon reconversion of the bisulfite to isatin. So that by the conversion of an isatin of around 200° C. melting point to its sodium bisulfite, e. g. by means of sodium bisulfite or sodium meta-bisulfite or pyrosulfite, treatment of the sodium bisulfite in solution with a decolorizing material, such as bone black, norit, or activated carbon, and subsequent conversion of the treated isatin sodium bisulfite to isatin by acidification, isatin of around 204° C. melting point and of excellent color and purity, is obtained. The acidification may be effected by gradually adding the isatin sodium bisulfite to a mineral acid solution, e. g. HCl or $H_2SO_4$, a 20–60% aqueous $H_2SO_4$ solution being satisfactory. The higher melting point of my product indicates that the product formerly recognized as isatin was not in fact the pure isatin. Since isatin is used chiefly in pharmaceutics, the advantages of the higher purity of the product will be apparent.

My process is applicable in particular to the purification of isatin and also to the purification of substitution products of isatin, for example C-alkyl, C-halogen, or C-alkoxy derivatives, among which may be mentioned 7-methyl isatin; 5,7-dimethyl isatin; 4,5,7-trimethyl isatin; 5-chlorisatin; 5-bromisatin; 5,7-dichlorisatin; 5,7-dibromisatin; 5,7-di-iodo-isatin; 4,5,7-tribromisatin; 7-methoxy isatin; 6,7-dimethoxy isatin; 5-methyl-6-chlor-isatin; 4-methyl-7-methoxy-isatin; 5-chlor-4-methyl-7-methoxy-isatin; 4-chlor-6-methoxy-isatin; and the naphthisatins, for example 2,1-naphthisatin and 2,3-naphthisatin, and the bisulfites of isatin and its derivatives such as isatin alkali-metal bisulfites and the alkali-metal bisulfites of the above named isatin substitution products. Of the alkali-metal bisulfites the sodium, potassium, and ammonium bisulfites are of especial importance.

The following examples are illustrative of my method of purification as applied to isatin obtained by the oxidation of indigo, the crude isatin having a melting point of 200° C. Quantities are expressed as parts by weight.

*Example I.*—A mixture of 325 parts of the impure isatin, 500 parts of water, and 260 parts of sodium pyrosulfite ($Na_2S_2O_5$) is heated to boiling. To the boiling solution are added about 40 parts of bone black and about 20 parts of a filter-aid, for example, diatomaceous earth or kieselguhr. The mixture is boiled for about 30 minutes and then filtered while hot, the residue on the filter being washed with about 150 parts of hot water, the temperature of which advantageously may be between 75 and 100° C., and the wash-water being collected with the filtrate. This solution is then cooled, preferably with agitation, to 5° C. and is agitated at this temperature for about 30 minutes. As a result sodium isatin bisulfite crystallizes from the solution, which is then filtered off from the crystals. The crystals may be dried by passing air through them, as for example, by applying vacuum to the filter. Preferably the drying should take place at a temperature of 65 to 75° C.

The sodium isatin bisulfite prepared in the above manner has been found to possess a higher purity than the sodium isatin bisulfites now obtainable and may be used without reconversion to isatin as an intermediate in the preparation of other compounds such as the substituted quinoline carboxylates, and particularly 2-phenylquinoline-4-carboxylic acid. However, in many cases it is desirable to reconvert the sodium isatin bisulfite to isatin and I have found that a very pure product is obtainable in this manner.

The following is illustrative of the method which may be employed for forming the isatin from the purified isatin bisulfite.

*Example II.*—To 410 parts of 50% aqueous sulfuric acid there is gradually added 492 parts of the sodium isatin bisulfite prepared in the manner described in Example I. The sodium isatin bisulfite may be added either dry or in the form of a paste. In the latter case, of course, the weight of material used may be proportionately increased. The sulfuric acid should be continuously agitated during the addition of the sodium isatin bisulfite and the materials advantageously may be maintained at room temperature, i. e., 20 to 25° C. The mixture is stirred at room temperature until evolution of sulfur dioxide ceases, as may be indicated by the reaction of Congo red paper towards the evolved gases and vapors. About 12 to 15 hours of agitation ordinarily are sufficient to complete the reaction. As a result of this decomposition of the sodium isatin bisulfite, free isatin is precipitated. This is filtered off, washed with water until acid-free and is then dried, preferably at about 75 to 85° C. In this manner there is obtained on an average about 86 to 87% purified isatin based on the isatin initially employed. The product has a melting point of about 203.8 to 204° C.

If the crude isatin of 200° C. melting point is converted to the isatin sodium bisulfite in accordance with the above process and then without treatment with the adsorbent bone black is crystallized from solution, separated from mother liquor and acidified by the method of Example II, a product of somewhat greater purity than the initial isatin is obtained. However, this product will possess neither the color nor the melting point of the product obtainable by the method described in the example and wherein the sodium isatin bisulfite solution has been treated with bone black prior to its crystallization.

In place of the sodium isatin bisulfite above prepared, the potassium or ammonium salt may be formed in a like manner to produce a similar purified product. In this case the sodium pyrosulfite may be replaced by the corresponding potassium or ammonium salt. Likewise the bisulfites, $MeHSO_3$, wherein Me represents an alkali-metal, are equivalent to the pyrosulfite used in the example, and the ordinary sodium bisulfite ($NaHSO_3$) or another of the alkali-metal bisulfites may be employed in its stead.

I claim:

1. The method of purifying crude isatin to separate therefrom impurities present as a result of the preparation of the crude isatin, which comprises forming a hot aqueous solution of alkali-metal isatin bisulfite, contacting the solution with adsorptive decolorizing material, separating the solution of alkali-metal isatin bisulfite from the decolorizing material, mixing the separated alkali-metal isatin bisulfite with an aqueous acid solution to convert the alkali-metal isatin bisulfite to isatin, and separating the isatin thus obtained from the aqueous solution.

2. The method of purifying crude isatin to separate therefrom impurities present as a result of the preparation of the crude isatin, which comprises heating the crude isatin with an aqueous alkali-metal bisulfite to form a hot aqueous solution of alkali-metal isatin bisulfite, contacting the solution with adsorptive decolorizing material, separating the decolorizing material from the solution and subsequently cooling the separated solution to separate therefrom alkali-metal isatin bisulfite, mixing the alkali-metal isatin bisulfite thus separated with an aqueous sulfuric acid solution whereby isatin is precipitated, and separating the isatin from the aqueous solution.

3. The method of purifying crude isatin of 200° C. melting point obtained by the oxidation of indigo, which comprises heating the crude isatin with an aqueous sodium bisulfite solution to form sodium isatin bisulfite solution, contacting the solution with bone black, separating the bone black from the solution and subsequently cooling the separated solution to separate therefrom sodium isatin bisulfite, gradually adding the sodium isatin bisulfite thus separated to an aqueous sulfuric acid solution of about 20–60% $H_2SO_4$ concentration, agitating the mixture until evolution of sulfur dioxide ceases whereby isatin is precipitated, and separating the isatin from the aqueous solution.

4. The method of purifying crude isatin to remove impurities present as a result of the production of the isatin, which comprises heating the crude isatin with an aqueous alkali-metal bisulfite to form a hot aqueous solution of alkali-metal isatin bisulfite addition product, contacting the solution with adsorptive decolorizing material, separating the decolorizing material from the solution, subsequently cooling the separated solution to separate therefrom alkali-metal isatin bisulfite addition product, mixing the alkali-metal isatin bisulfite addition product thus separated with aqueous hydrochloric acid solution whereby isatin is precipitated, and separating the isatin from the aqueous solution.

5. In the purification of a crude isatin so as to remove therefrom impurities resulting from the preparation of the crude isatin, the improvement which comprises forming an aqueous solution of an alkali-metal bisulfite addition product of the isatin, treating the solution with an adsorptive decolorizing material, and separating the decolorizing material from the solution.

6. The method of purifying a crude isatin so as to remove therefrom impurities resulting from the preparation of the crude isatin, which comprises forming an aqueous solution of an alkali-metal bisulfite addition product of said isatin, treating the solution with adsorptive decolorizing material, separating the decolorizing material from the solution, and crystallizing the addition product from the separated solution.

7. The method of purifying a crude isatin so as to remove therefrom impurities resulting from the preparation of the crude isatin, which comprises forming an aqueous solution of an alkali-metal bisulfite addition product of the isatin, crystallizing the addition product from solution, separating the crystallized addition product from solution, and mixing the crystallized addition product with an acid solution so as to liberate the isatin from the addition product.

ROBERT C. HOARE.